Figure 1:
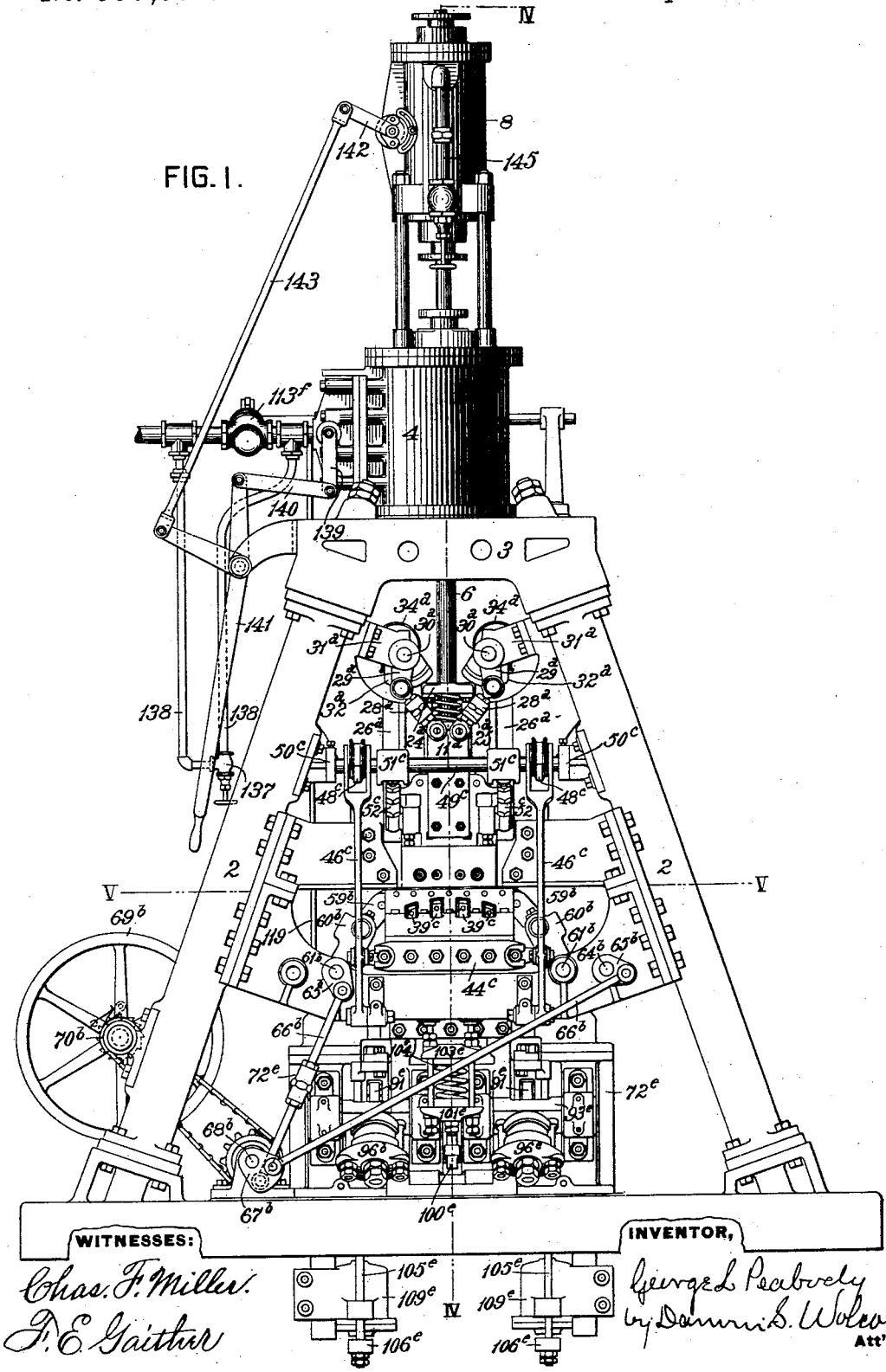

(No Model.) 12 Sheets—Sheet 2.
G. L. PEABODY.
PRESS.
No. 590,588. Patented Sept. 28, 1897.
FIG. 2.
FIG. 24.
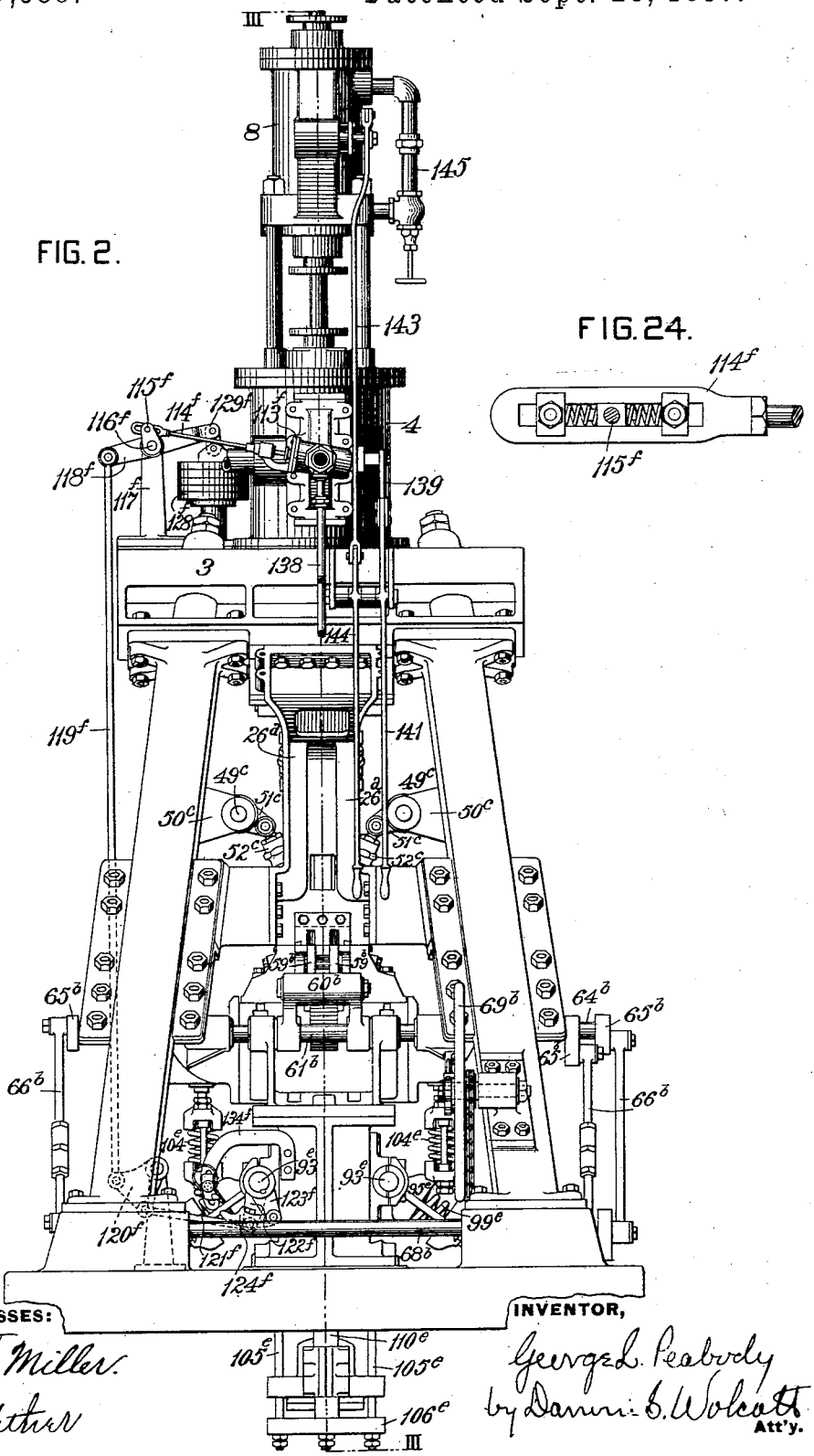
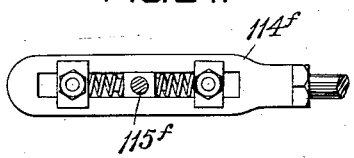
WITNESSES:
Chas. F. Miller
F. E. Gaither
INVENTOR,
George L. Peabody
by Damon C. Wolcott
Att'y.

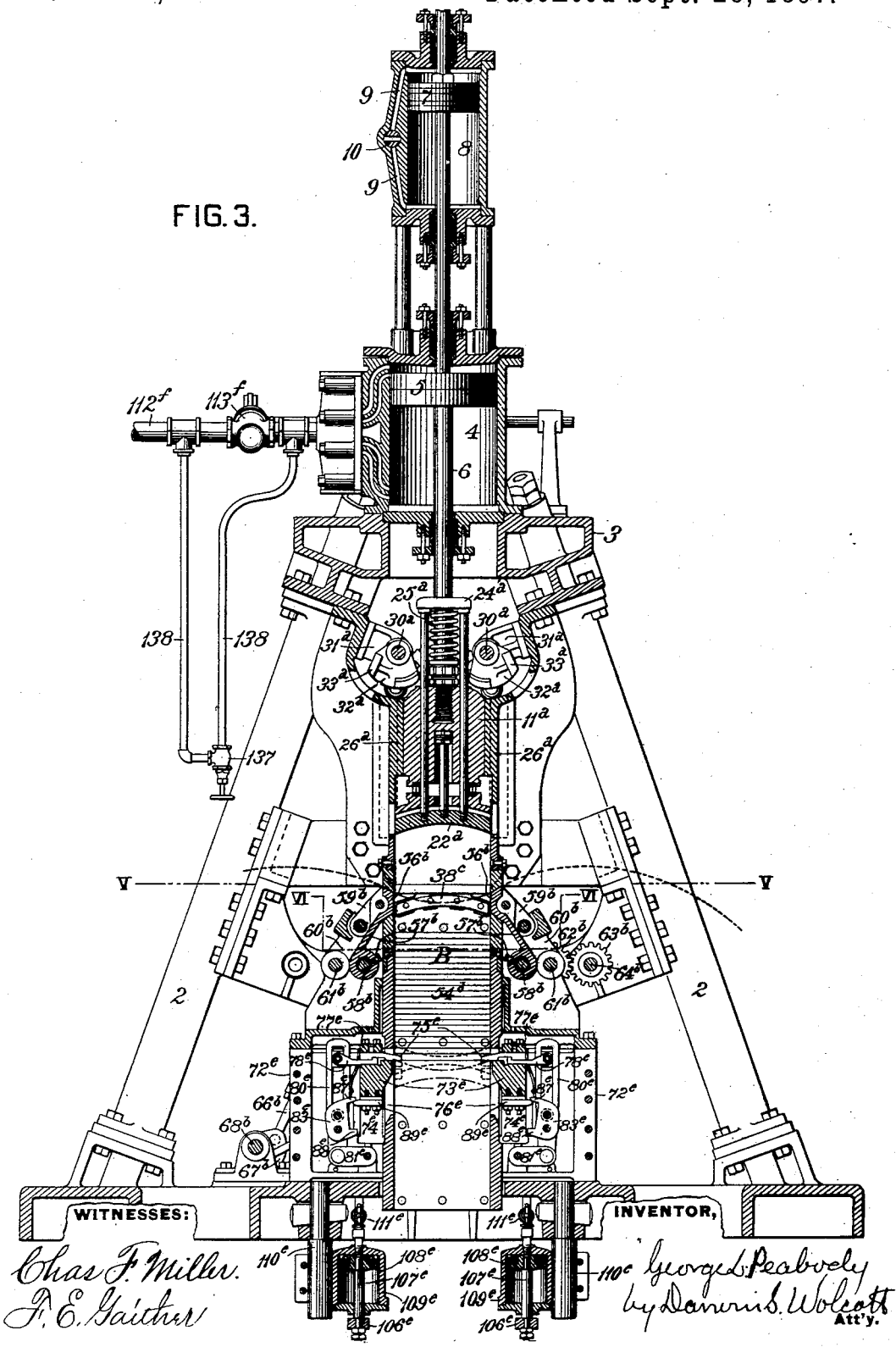

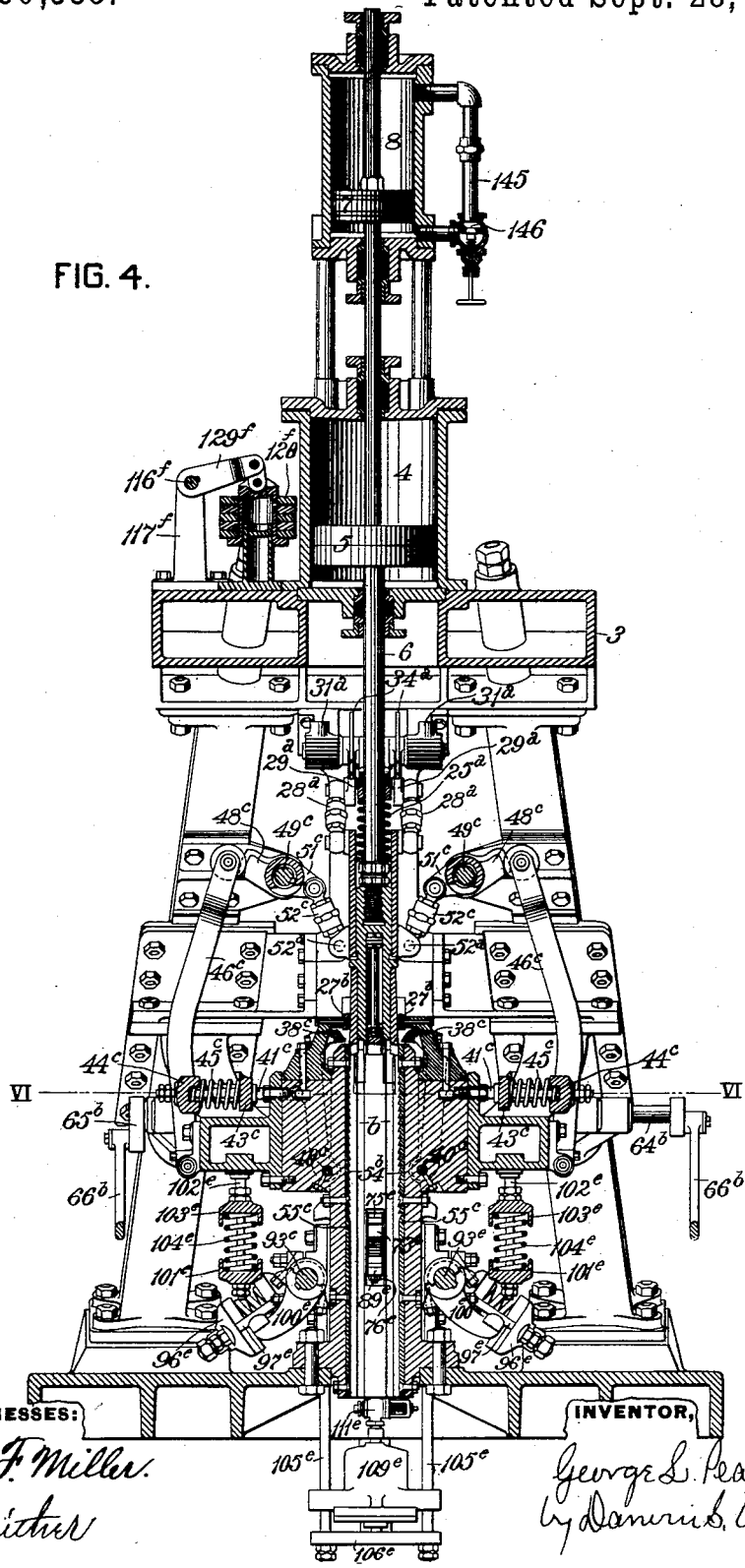

(No Model.) 12 Sheets—Sheet 5.

G. L. PEABODY.
PRESS.

No. 590,588. Patented Sept. 28, 1897.

WITNESSES:
Chas. F. Miller.
F. E. Gaither.

INVENTOR,
George L. Peabody
by Darwin S. Wolcott
Att'y.

(No Model.) 12 Sheets—Sheet 6.

G. L. PEABODY.
PRESS.

No. 590,588. Patented Sept. 28, 1897.

WITNESSES:
Chas. F. Miller.
J. E. Gaither

INVENTOR,
George L. Peabody,
by Damron S. Wolcott
Att'y.

(No Model.) 12 Sheets—Sheet 7.

G. L. PEABODY.
PRESS.

No. 590,588. Patented Sept. 28, 1897.

WITNESSES:
Chas. F. Miller.
F. E. Gaither

INVENTOR,
George L. Peabody
by Darwin S. Wolcott
Att'y.

(No Model.) 12 Sheets—Sheet 8.

G. L. PEABODY.
PRESS.

No. 590,588. Patented Sept. 28, 1897.

WITNESSES:
Chas. F. Miller
F. E. Gaither

INVENTOR,
George L. Peabody
by Dominis S. Wolcott
Att'y.

THE NORRIS PETERS CO., PHOTO-LITHO., WASHINGTON, D. C.

(No Model.) 12 Sheets—Sheet 9.

G. L. PEABODY.
PRESS.

No. 590,588. Patented Sept. 28, 1897.

WITNESSES:
Chas. F. Miller
F. E. Gaither

INVENTOR,
George L. Peabody
by Danvers S. Wolcott
Att'y.

THE NORRIS PETERS CO., PHOTO-LITHO., WASHINGTON, D. C.

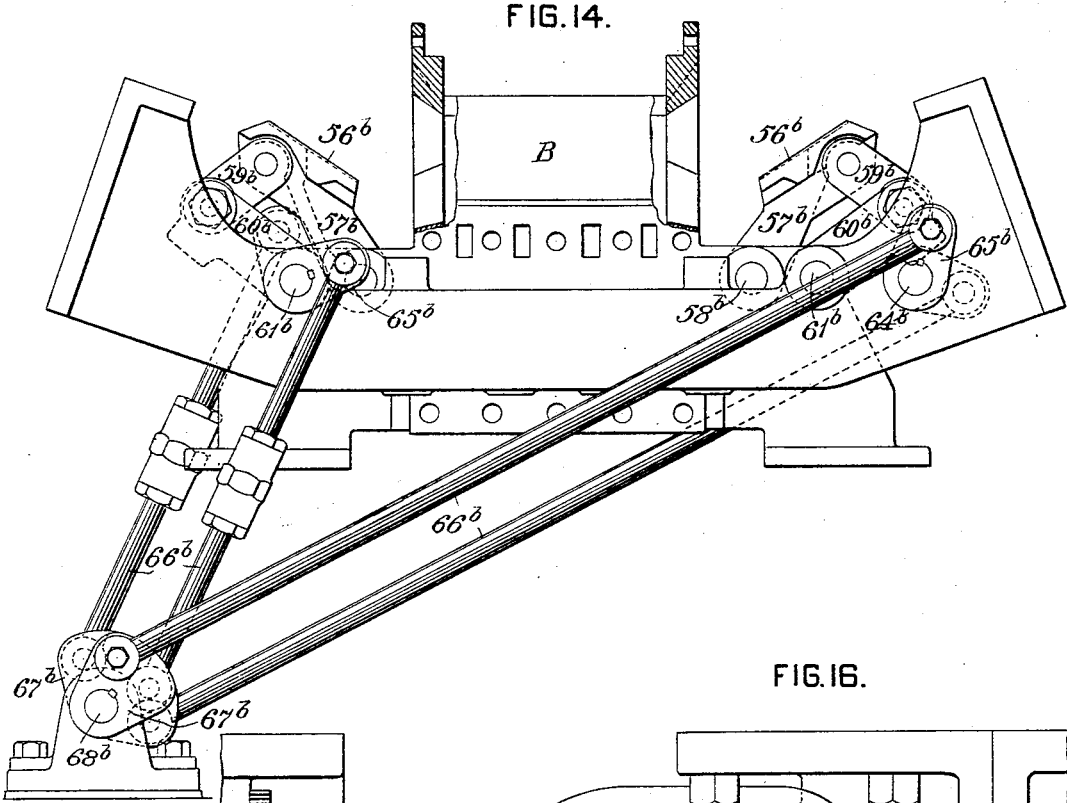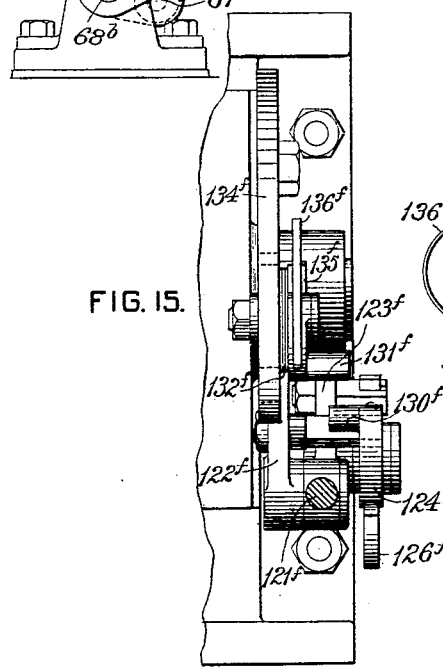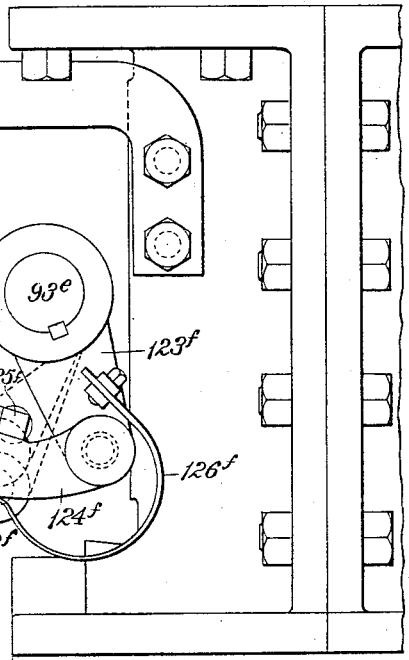

(No Model.) 12 Sheets—Sheet 11.

G. L. PEABODY.
PRESS.

No. 590,588. Patented Sept. 28, 1897.

WITNESSES:
Chas. F. Miller
J. E. Gaither

INVENTOR,
George L. Peabody
by Danvers B. Wolcott
Att'y.

(No Model.) 12 Sheets—Sheet 12.
G. L. PEABODY.
PRESS.
No. 590,588. Patented Sept. 28, 1897.
FIG. 21.
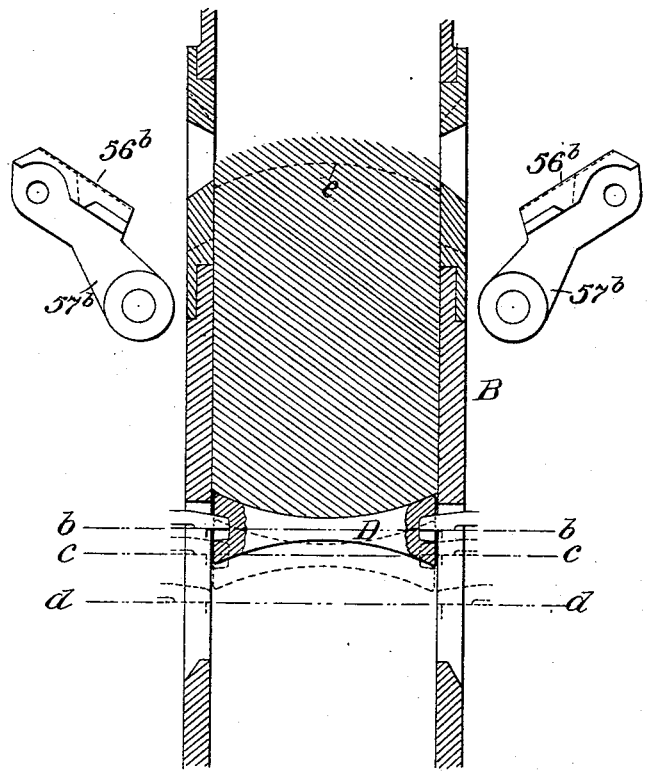
FIG. 23.
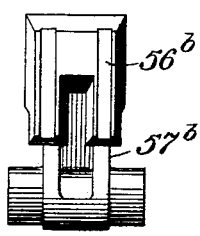
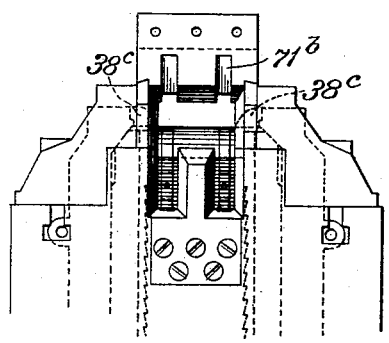
FIG. 22.
WITNESSES:
Chas. F. Miller
F. E. Gaither
INVENTOR,
George L. Peabody
by Darwin S. Wolcott
Att'y.
THE NORRIS PETERS CO., PHOTO-LITHO., WASHINGTON, D. C.

UNITED STATES PATENT OFFICE.

GEORGE L. PEABODY, OF PITTSBURG, PENNSYLVANIA.

PRESS.

SPECIFICATION forming part of Letters Patent No. 590,588, dated September 28, 1897.

Application filed June 30, 1896. Renewed July 29, 1897. Serial No. 646,414. (No model.)

*To all whom it may concern:*

Be it known that I, GEORGE L. PEABODY, a citizen of the United States, residing at Pittsburg, in the county of Allegheny and State of Pennsylvania, have invented or discovered certain new and useful Improvements in Presses, of which improvements the following is a specification.

The invention described herein relates to certain improvements in continuous presses; and it consists, generally stated, in mechanism for compressing the article, cutting-plates for cutting the excess length of such articles, a retaining-plunger movable with the compressing mechanism for holding the compressed material during the upstroke of the main plunger and cutting-plates, catches for holding the compressed material during the shifting of additional material into the press, yielding supports for the material operating in opposition to the main or compressing plunger, whereby the degree of compression can be regulated automatically, automatically-operating mechanism for withdrawing the supports, and mechanism for stopping the compressing-plunger on the withdrawal of the supports, all as more fully hereinafter described and claimed.

Figure 5:
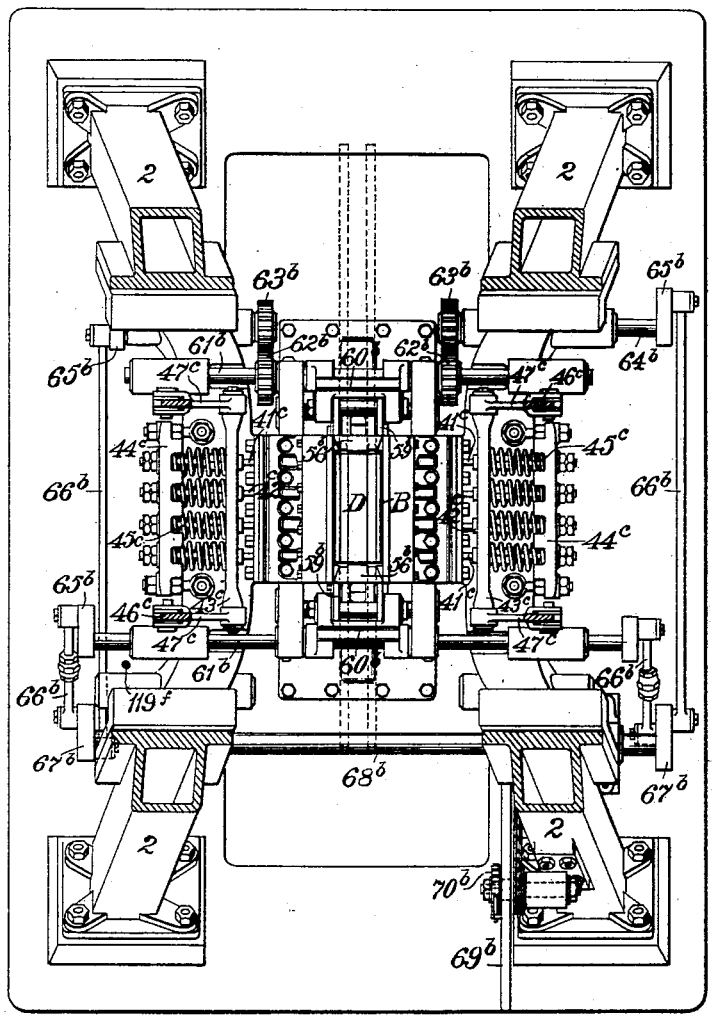
Figure 6:
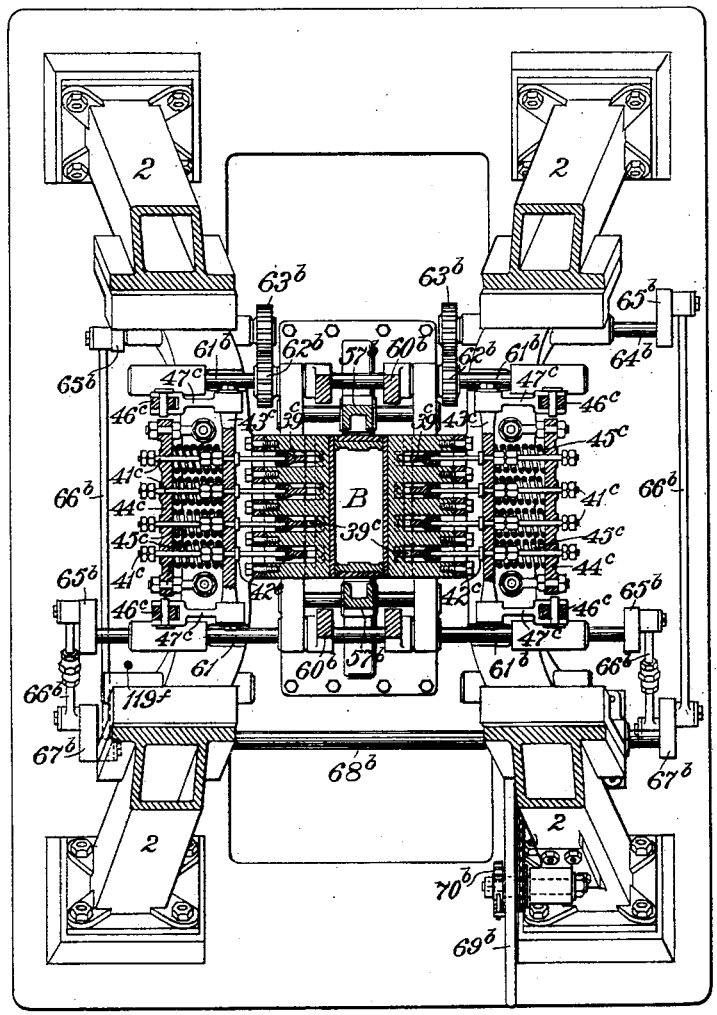
Figure 7:
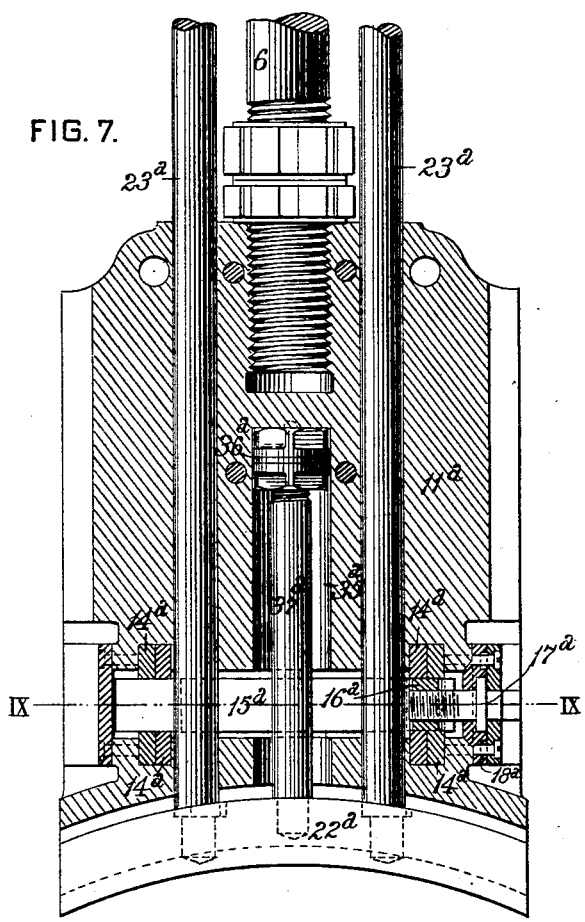
Figure 8:
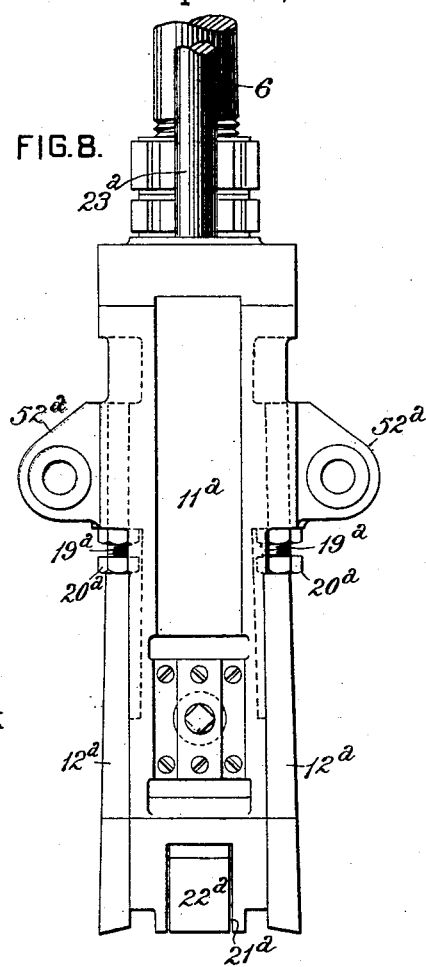
Figure 9:
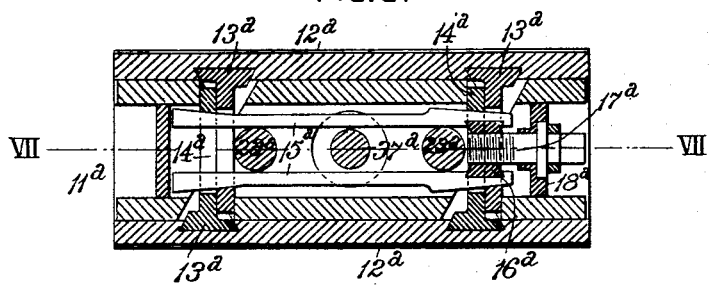
Figure 10:
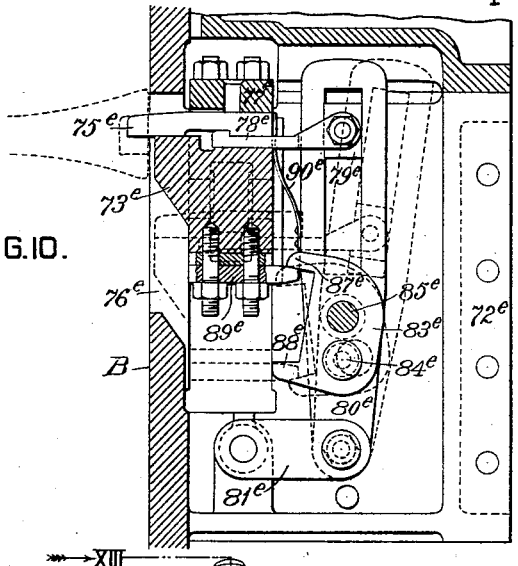
Figure 11:
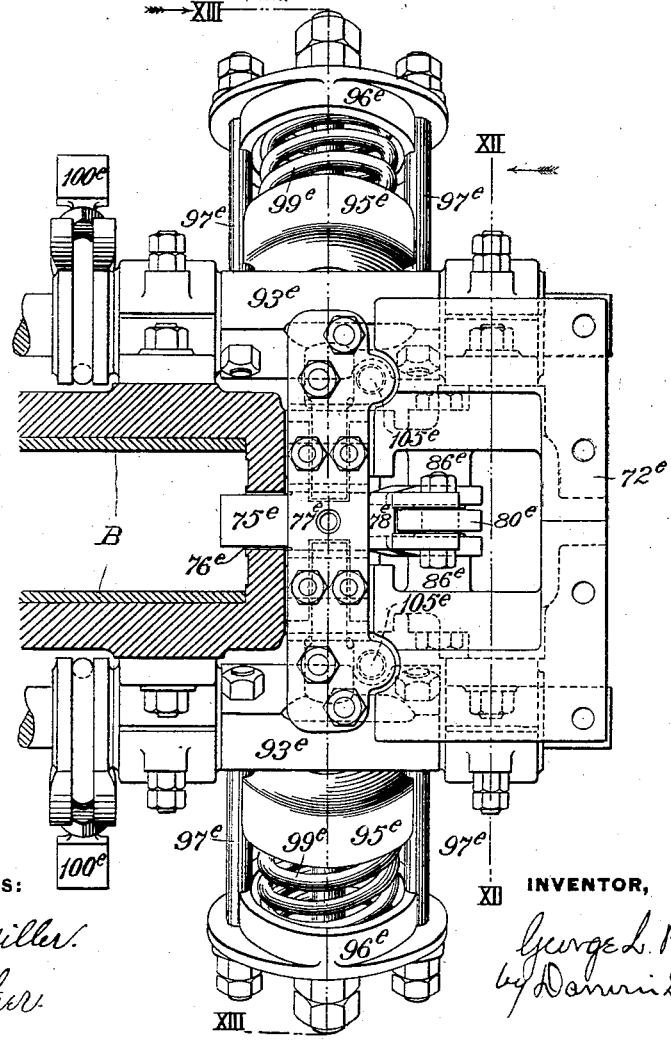
Figure 12:
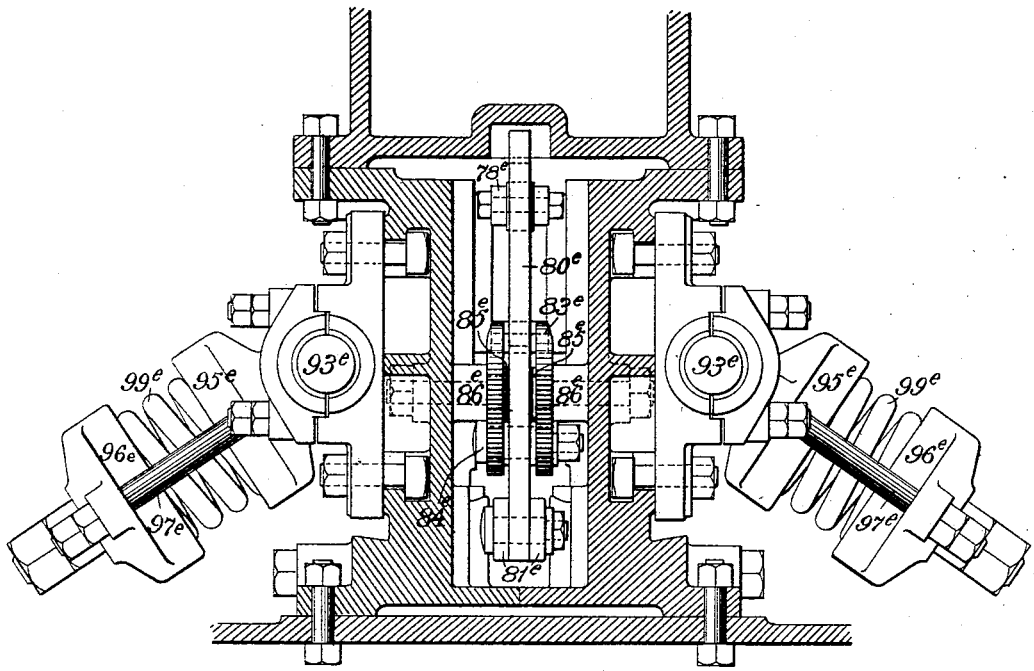
Figure 13:
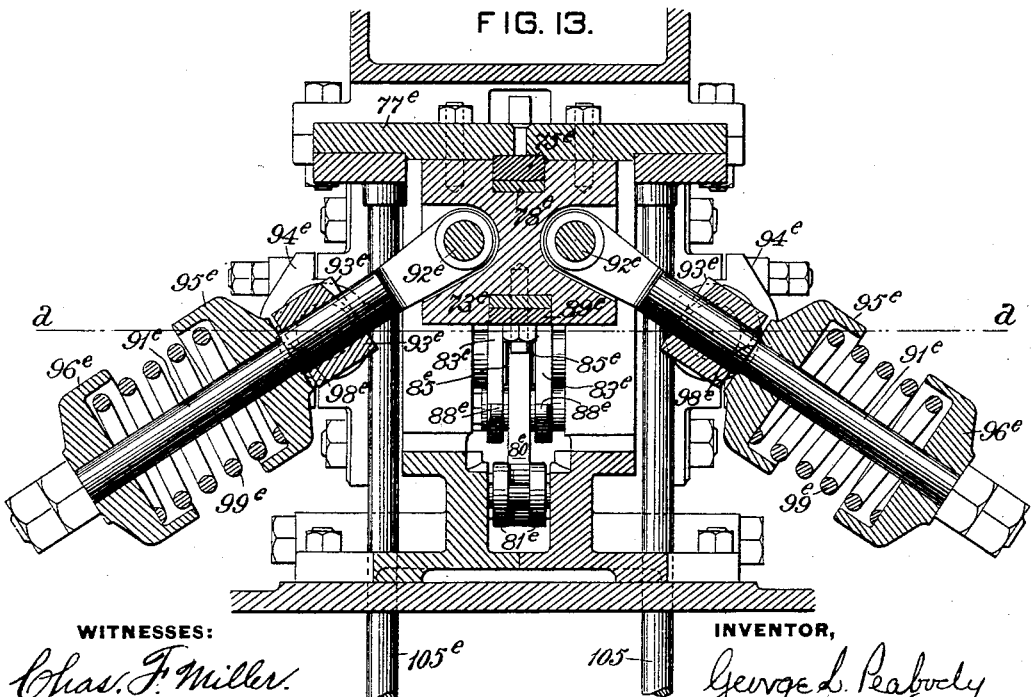
Figure 17:
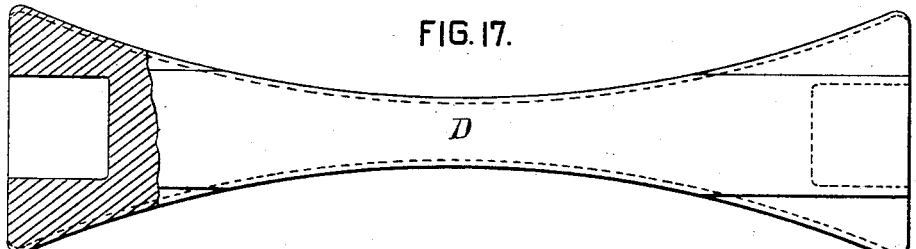
Figure 18:
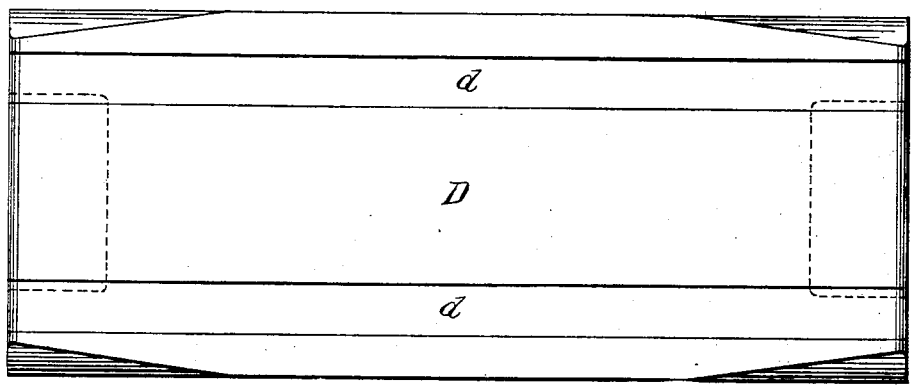
Figure 19:
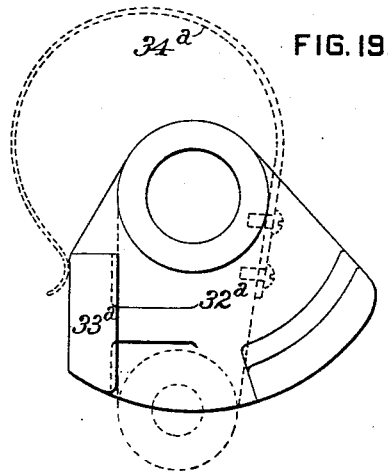
Figure 20:
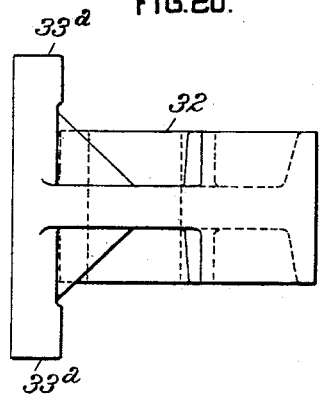

In the accompanying drawings, forming a part of this specification, Figure 1 is a side elevation of my improved press. Fig. 2 is a similar view at right angles to Fig. 1. Fig. 3 is a sectional elevation, the plane of section being indicated by the line III III, Fig. 2. Fig. 4 is a similar view, the plane of section being indicated by the line IV IV, Fig. 1. Fig. 5 is a sectional plan view, the plane of section being indicated by the line V V, Fig. 1. Fig. 6 is a similar view, the plane of section being indicated by the line VI VI, Fig. 4. Fig. 7 is a sectional elevation, on an enlarged scale, of the compressing and retaining plunger, the plane of section being indicated by the line VII VII, Fig. 9. Fig. 8 is an edge elevation of the plunger. Fig. 9 is a sectional plan view, the plane of section being indicated by the line IX IX, Fig. 7. Fig. 10 is a view, partly in section and partly in elevation, illustrating the mechanism for supporting the followers and withdrawing the same. Fig. 11 is a view, partly in plan and partly in section, showing the compressing-box, the follower-supports, and their supporting mechanism. Figs. 12 and 13 are sectional elevations, the planes of section being indicated, respectively, by the line XII XII and XIII XIII of Fig. 11. Fig. 14 is a detail view, partly in section and partly in elevation, illustrating the upper portion of the compressing-box, the removable side sections of such box, and mechanism for shifting such sections. Figs. 15 and 16 are edge and side elevations, respectively, of the mechanism for stopping the press. Figs. 17 and 18 are side and plan views, respectively, of one of the followers. Figs. 19 and 20 are side elevations of under side plan of the cams employed for holding the retaining-plunger from upward movement. Fig. 21 is a sectional diagrammatic view showing the different positions of the follower from the beginning of compression to the point of release. Figs. 22 and 23 are detail elevations of the open portion of the compressing or molding box and the movable sections for closing the same. Fig. 24 is a detail view, on an enlarged scale, of the connection between the cut-off valve and its operating mechanism.

In the practice of my invention the several mechanisms hereinafter described are connected to and supported by a suitable frame consisting of a base 1, standards 2, and top plate 3. On the top plate is secured a cylinder 4, having a piston 5 and piston-rod 6. The latter projects up through the upper end of the steam-cylinder 4 and is connected with a piston 7 in the cylinder 8. In the wall of this cylinder 8 is formed a passage 9, connected at its ends with the interior of the cylinder at or near the ends thereof. About midway of the passage 9 is formed a chamber for the reception of a valve 10, whereby the flow of fluid from one end to the other of the cylinder can be regulated as desired. The purpose of this cylinder 8 is to regulate the movements of the piston in the main or compressing cylinder, which is employed for operating the compressing-plunger, as by turning the valve the flow of fluid from one side of the piston 7 to the opposite side thereof, such flow being effected by the piston itself, can be regulated.

To the lower end of the piston-rod 6 is attached a plunger 11$^a$, said plunger conforming in cross-sectional contour to or approximately to the cross-sectional contour of the compressing-box, which will be hereinafter described. The sides of the plunger 11ª are recessed or cut away for the reception of the cutting-plates 12ª, which are held in position by any suitable mechanism—such, for example, as that shown in Figs. 7, 8, and 9. The inner faces of the cutting-plates 12ª are provided with dovetailed recesses for the reception of correspondingly-shaped blocks 13ª, formed on the ends of slotted plates or links 14ª, which are arranged in transverse openings through the plunger. Through these links are arranged bars 15ª, having inclines at their ends and connected at one end to a block 16ª, which is provided with an internally-threaded opening for the reception of the threaded stem 17ª. This stem is held within the plunger with freedom of rotation by means of a block 18ª, secured within the plunger in any suitable manner. It will be readily understood that by rotating the stem 17ª in a direction to draw block 16ª to the right in Fig. 9, the inclines on the bars 15ª will bear against the end walls of the slots in the links 14ª, so as to move such links inwardly and thereby draw the plates 12ª tightly against the sides of the plunger. In order to hold the plates 12ª stationary when in operation, and also to adjust them down, threaded bolts 19ª, having heads 20ª, are screwed into threaded openings in the plunger in line with the upper ends of the plates 12ª. By loosening the links 14ª and turning the screws 19ª the blades 12ª can be adjusted downwardly, and held in such position by again forcing the links 14ª inwardly.

As shown in Figs. 3, 7, and 8, the plunger 11ª is provided on its lower face with a recess 21ª for the reception of the retaining-plunger 22ª, which is attached to the lower ends of rods 23ª, passing through openings in the plunger 11ª and connected at their upper ends to the cross-head 24ª. Between the cross-head 24ª and the plunger 11ª is arranged a spring 25ª, adapted to hold the retaining-plunger 22ª within its recess in the plunger 11ª.

The plunger 11ª is arranged between guides 26ª, attached to the standards 2, as clearly shown in Figs. 2 and 3, said guides extending down to or approximately to the upper end of the compressing-box. As the plunger is forced down the material is pressed into the compressing-box B, the projecting ends of such material being cut by the conjoint action of the blades 12ª and the stationary blades 27ᵇ, supported on the compression-box, as hereinafter described. To the sides of the plunger 11ª are connected links 28ª, the opposite ends thereof being connected to arms 29ª on the shaft 30ª, mounted in suitable bearings 31ª, attached to the frame of the press. On these shafts 30ª are loosely mounted cams 32ª, provided on their rear edges with wings 33ª, which are normally held in contact with the rear edge of the arms 29ª by the springs 34ª, as clearly shown in Figs. 1, 3, 19, and 20.

In Fig. 3 the plunger is shown in its elevated position and the links 28ª form an acute angle with the arms 29ª. As the plunger descends the links move to a position approximately at right angles to the arms and thereby through said arms push the cams 32ª outwardly, so as to permit of the passage of the cross-head 24ª between the cams. As the plunger continues its downward movement the links are so shifted as to draw the arms 29ª inwardly and thereby bring the spring 34ª under a considerable tension, so that they will tend to force the cams toward each other. As soon as the cross-head 24ª passes below the cams the latter will be forced inwardly above the cross-head by the springs 34ª, thereby holding the cross-head and through the bars 23ª the retaining-plunger stationary during the first upward movement of the plunger 11ª. As the main plunger moves up the links 28ª are moved gradually toward a position at right angles to the arms 29ª, thereby pushing said arms outwardly into contact with the wings 33ª. The outward movement of the arms 29ª will force the cams apart from over the cross-head, thereby permitting the spring 25ª to raise the retaining-plunger 22ª into the recess in the lower end of the main plunger. In order to prevent the plunger coming up with great force, or, in other words, to regulate the action of the spring 25ª, a socket 35ª is formed in the main plunger, and in this socket is arranged a piston 36ª, which is attached to the retaining-plunger 22ª by a stem 37ª. An opening (shown in dotted lines in Fig. 7) is formed at the upper end of the socket or chamber 35 for the regulated escape of air, thereby permitting the spring to raise the retaining-plunger, as stated, but with a regulating movement.

As shown in Figs. 1 and 3, the two sides of the compression or holding box are attached to the guides 26ª, thereby forming a continuous wall to retain the straw or other material laterally when it is fed in under the plunger. As hereinbefore stated, the descent of the plunger effects first the cutting off of the ends of the straw by means of the blades 12ª and 27ᵇ, and the portion of the straw or other material between such cutting-blades 27ᵇ is then forced down into the compressing-box. The main plunger and cutting-blades are then raised, but the compression effected is maintained by means of the retaining-plunger 22ª until the catches can be forced in over the compressed material. These retaining-catches consist of bars 38ᶜ, preferably concavo-convex, as shown in Fig. 3, attached to the upper ends of arms 39ᶜ, which are arranged in slots or recesses in the blocks forming the sides of the molding-box, as shown in Figs. 1, 3, 5, and 6. These arms 39ᶜ are mounted at their lower ends on shafts 40ᶜ, as shown in Fig. 4, and are attached to the inner ends of bolts 41$^c$, as shown in Figs. 4, 5, and 6. These bolts project laterally through openings in the blocks on the sides of the compressing-box and are provided with shoulders 42$^c$, as shown in Figs. 5 and 6. These bolts extend through bars 43$^c$ and through stationary cross-heads 44$^c$, as shown in Figs. 5 and 6. The bolts are attached so as to move with the bars 43$^c$ by means of nuts screwed onto the bolts and drawing the shoulders 42$^c$ on said bolts up against the bars 43$^c$. On the portions of the bolts between the bars 43$^c$ and the stationary crosshead 44$^c$ are arranged springs 45$^c$, adapted to force the bars, bolts, and catches inwardly, so that the bars 38$^c$ of said catches will project over the molding or compressing box. As shown in Figs. 5 and 6, the bars 43$^c$ have their ends connected to levers 46$^c$ by links 47$^c$, so that by the movement of these levers the catches may be withdrawn from over the molding or compressing box. The upper ends of the levers 46$^c$ are forced outwardly by means of cams 48$^c$, arranged on shafts 49$^c$, which are mounted in bearings 50$^c$, secured to the frame of the machine, as shown in Figs. 1, 2, and 4. On the shafts 49$^c$ are secured arms 51$^c$, which have their outer ends connected by links 52$^c$ to ears 52$^a$ on the main plunger 11$^a$. As this main plunger descends the cams 48$^c$ are so operated as to force the levers 46$^c$ outward and thereby withdraw the bars 38$^c$ of the catches from over the compressing or molding box, so as to permit the downward movement of the plunger and its knives, as clearly shown in Fig. 4. The cams 48$^c$ are so set as regards the movement of the main plunger 11$^a$ that when the latter has been raised above the level of the bars 38$^c$ of the catches the cams will permit the inward movement of the levers 46$^c$ by the springs 45$^c$ and the consequent movement of the bars 38$^c$ in over the compressing or molding box. During this upward movement of the main plunger and the inward movement of the bars 38$^c$ the material compressed by the downward movement of the plunger will be retained in its compressed condition by the retaining-plunger 22$^a$, as hereinbefore described.

In order to assist in the retention of whatever compression may be effected by the downward movement of the main plunger, the sides of the molding and compressing box B against which the ends of the straw or other material to be compressed will abut are provided with a series of notched or toothed plates 54$^b$, as shown in Fig. 4. As the ends of the straw or other material pass below the teeth thus formed in the sides of the molding-box such teeth will prevent any upward movement thereof.

Prior to feeding any material into the molding-box and compressing it blocks or followers D are placed within the box and allowed to drop down until engaged by supporting-tongues which project into openings in the ends of the box, as hereinafter described. Also prior to any compression bale-bands, which are adapted to be secured around a compressed block or bale, are arranged transversely of the compressing-box. In order to permit of the insertion of the bands and also the securing of them around a molded block or bale, two sides of the compressing-box are made removable. The removable sections 56$^b$ of the box are attached to or are formed integral with arms 57$^b$, which are mounted on shafts 58$^b$, arranged in suitable bearings on the frame of the machine. On the backs of the arms 57$^b$ are connnected links 59$^b$, to which are connected arms 60$^b$, secured on shafts 61$^b$. On one of the shafts 61$^b$ is keyed a pinion 62$^b$, adapted to intermesh with a corresponding pinion 63$^b$ on the shaft 64$^b$. On the other shaft 61$^b$ and on the shaft 64$^b$ are keyed arms 65$^b$, whose outer ends are connected to the ends of rods 66$^b$, the opposite ends of said rods being connected to disks 67$^b$, keyed on the shaft 68$^b$. As the shaft 68$^b$ is rotated the shafts 61$^b$ and 64$^b$ will also be rotated, thereby shifting the links or arms 60$^b$ and through them the movable wall-sections 56$^b$, one of the shafts 61$^b$ being rotated through the pinions 62$^b$ and 63$^b$. By the outward movement of the arms 60$^b$ the arms 57$^b$ and the sections 56$^b$ of the molding or compressing box will also be moved outward, so as to permit of access to the interior of the compressing-box to secure the bale-band around the bale in the mold or compressing-box. By the opposite rotation of the shaft 68$^b$ the sections 56$^b$ will be moved back into position. It will be observed that the shafts 61$^b$ and 64$^b$ have arms 65$^b$ at both ends and that said arms on each shaft are at right angles to each other and have independent rods 66$^b$ connecting them to the disks 67$^b$ on the operating-shaft 68$^b$. This construction facilitates the shifting of the wall-sections to and from operative position and the holding of such sections in closed or operative position. The shaft 68$^b$ is rotated by means of a hand-wheel 69$^b$ through the medium of a sprocket chain and wheels, as shown in Fig. 1. The operating-wheel 69$^b$ is locked, so as to hold the parts in operative position, by means of a pawl and ratchet 70$^b$ on the shaft of said wheel, as shown.

As shown in Fig. 12, slots 71$^b$ are formed through the walls of the mold or compressing-box immediately above the removable section 56$^b$, so as to permit the band to be gradually drawn in as compression is effected.

The yielding supports of the compression-regulating device are arranged within suitable housings 72$^e$, located on opposite sides of the compressing-box or mold. Within these housings are arranged blocks 73$^e$, adapted to move vertically in suitable guideways 74$^e$ on the sides of the housings. On top of the blocks 73$^e$ are arranged tongues 75$^e$, adapted to move back and forth on the blocks, so as in one position to project through vertical slots 76$^e$ in the sides of the compressing-box or mold and at other times to be in such position that their inner ends will be outside of the inner surface of the compressing-box or mold, as shown in Fig. 10. These tongues $75^e$ are held in position with the freedom of movement as above stated by means of caps $77^e$, bolted to the upper ends of the sliding blocks $73^e$, and the tongues are provided on their under sides with recesses for the reception of the upturned ends of the arms $78^e$, whose outer ends are pivotally connected with blocks $79^e$, arranged to slide vertically in the slots in the vertical levers $80^e$. The lower ends of the levers $80^e$ are loosely connected by links $81^e$ to posts $82^e$, projecting up from the lower walls of the housings. To opposite sides of each of the levers $80^e$ are pivotally connected dogs $83^e$, the pivotal connection between said dogs and the levers being formed by pins $84^e$, passing through said dogs and the lever $80^e$, as clearly shown in Fig. 12. These dogs have stationary pivotal supports formed by pins $85^e$, passing through the dogs and mounted in sockets $86^e$, formed integral with the side walls of the housings $72^e$, as clearly shown in Figs. 11 and 12. On the inner edges of the dogs and at the opposite ends thereof are formed toes $87^e$ and $88^e$, which project into the path of movement of the fingers $89^e$, secured to the lower ends of the blocks $73^e$. As these blocks move down, as hereinafter described, these fingers $89^e$ strike against the toes $88^e$ at the lower ends of the dogs $83^e$ and thereby shift such dogs on their stationary pivotal pins $85^e$, the lower ends of the dogs moving outward and carrying with them the levers $80^e$. These outward movements of the upper ends of the levers $80^e$ will through the medium of the links $78^e$ pull the pins or tongues $75^e$ outwardly, and thereby release the follower D. It will be observed that the recesses in the under sides of the tongues $75^e$ are of sufficient length to permit the tongues being moved outwardly such a distance that their inner ends will be outside of the path of movement of the followers D independent of any movement of the arms or links $78^e$. The tongues $75^e$ are, however, normally held so that their inner ends will project into the compressing-box or mold by the springs $90^e$, secured at one end to the levers $80^e$, while their free ends bear against the outer ends of the tongues $75^e$. These springs normally hold the upturned ends of the arms or links $78^e$ and the rear walls of the slots in the under sides of the tongues $75^e$ against each other, as clearly shown in Fig. 10. As the blocks $73^e$ are raised in the manner hereinafter stated the fingers $89^e$ will strike against the toes $87^e$ at the upper ends of the dogs $83^e$, thereby so shifting the dogs as to move the upper ends of levers $80^e$ inwardly, so as to permit the tongues $75^e$, when free to move, to be shifted by the springs $90^e$, so that their inner ends will project into the compressing-box or mold.

As shown in Figs. 1, 11, 12, and 13, the inner ends of rods $91^e$ are pivotally connected to the sliding blocks $73^e$, such inner ends projecting into recesses in opposite sides of the blocks $73^e$ and held within said recesses by pins $92^e$. These rods $91^e$ pass through transverse openings in shafts $93^e$, which are mounted in bearings $94^e$, formed on or secured to the sides of the mold-box and housings, and also through caps $95^e$ and $96^e$. The outer caps $96^e$ are held from outward movement when the bars or rods $91^e$ are shifted longitudinally, as hereinafter described, by means of the rods $97^e$, connected to ears or lugs on the caps $96^e$ and to the shafts $93^e$. Springs $99^e$ are arranged between the caps $95^e$ and $96^e$, the former being held against the shoulders $98^e$ by the springs. As the blocks $73^e$ move downwardly the rods $91^e$ are pushed through the shafts $93^e$, thereby forcing the caps $95^e$ outwardly and compressing the springs $99^e$, and as said rods approach a horizontal position the tension of these springs gradually increases, and in consequence thereof a greater resistance is presented to the downward movements of the blocks $73^e$ until they assume a horizontal position, at which point the tension of the springs will be ineffective to produce any movement of the blocks $73^e$. A little below that point in the movement of the blocks $73^e$ where the bars or rods $91^e$ assume a horizontal position the fingers $89^e$ strike against the toes on the dogs $83^e$, thereby shifting the lever $80^e$ and the tongues $75^e$ to release the follower D.

On the shafts $93^e$ are secured arms $100^e$ in such manner that when the springs $99^e$ are at their fullest compression and the bars $91^e$ approach a horizontal position the ends of said arms $100^e$ will strike against caps $101^e$, which are supported on the frame of the machine by rods $102^e$, as clearly shown in Figs. 1 and 4. On these rods are also mounted caps $103^e$, and between the caps $101^e$ and $103^e$ are arranged springs $104^e$. The upper caps $103^e$ are held from movement on the rods by means of nuts or any suitable form or construction of abutment thereon, while the lower caps $101^e$ are free to move up said rods as they are lifted by the arms $100^e$. The resistance presented by the springs $104^e$ will aid the springs $99^e$ in resisting the downward movement of the blocks $73^e$, and will also tend to so rotate the shafts $93^e$ when the tongues $75^e$ will have been released from the follower, so as to raise the blocks $73^e$, the shafts operating to effect this upward movement of the blocks through the medium of the bars $91^e$, which pass through the shafts. It will be understood that as soon as the bars $91^e$ have been shifted above dead-center—*i.e.*, a position in which they are in the same horizontal plane—they will also tend to raise the blocks $73^e$ and will complete such upward movement of these blocks after the springs $104^e$ have ceased to operate on the arms $100^e$.

As shown in Figs. 3, 4, and 13, the caps $77^e$ are extended laterally beyond the blocks $73^e$, and to these caps are attached the upper ends of rods 105$^e$, which extend down through the bed-plate of the machine and are secured at their lower ends to cross-heads 106$^e$. To these cross-heads are secured the rods 107$^e$ of the pistons 108$^e$ within the cylinders 109$^e$, the latter being secured to studs 110$^e$, attached to the bed-plate of the machine. To the upper head of the cylinders 109$^e$ are attached automatically-operating valve mechanism 111$^e$, of any suitable or well-known construction, adapted to permit a comparatively slow flow of fluid-pressure from the cylinders as the pistons rise, and thereby prevent a quick upward thrust of the blocks 73$^e$ under the action of the springs 99$^e$.

In order to stop the operation of the compressing-plunger after the material has been compressed to the desired degree and before the tongues 75$^e$ are withdrawn from the follower, at which point it is desired to secure the bale-bands around the compressed material, automatically-operating mechanism, preferably of the type hereinafter described, is employed for cutting off the steam from the cylinder 4, at which time the passage 9 of the cylinder 8 is closed, so that the plunger will always be held in its raised position during the tying of the bale. Any suitable form of automatically-operating valve mechanism is employed for controlling the flow of steam to and from the cylinder 4 during the normal operation of the press. In the steam-supply pipe 112$^f$ is arranged a valve mechanism 113$^f$, of any suitable construction and adapted when shifted, as hereinafter described, to check the flow of steam to the cylinder. The stem 114$^f$ of the valve mechanism is connected to an arm 115$^f$ on the shaft 116$^f$, mounted in suitable bearings on the ends of posts 117$^f$ on the top plate 3 of the machine. On this shaft is also secured an arm 118$^f$, having the upper end of the rod 119$^f$ attached thereto, as shown in Fig. 3. The lower end of this rod 119$^f$ is attached to one corner of a disk 120$^f$, which is pivotally mounted in suitable bearings and is connected by a rod 121$^f$ to an arm 122$^f$, loosely mounted on one of the shafts 93$^e$. On this shaft 93$^e$ is keyed an arm 123$^f$, having a pawl 124$^f$ pivotally connected to its outer end. This pawl is normally held in operative relation to the pin 125$^f$, projecting from one side of arm 122$^f$, by a spring 126$^f$, secured at one end of the arm 123$^f$, while the opposite end presses against the pawl 124$^f$, as shown in Figs. 15 and 16. The pin 125$^f$ is held against a shoulder 127$^f$ by a weight 128$^f$, suspended from an arm 129$^f$ on the shaft 116$^f$, as clearly shown in Figs. 2 and 4, said weight operating through the arm 118$^f$, rod 119$^f$, disk 120$^f$, and rod 121$^f$. As the shaft 93$^e$ is rotated, as hereinbefore described, by the downward movement of the blocks 73$^e$, the arm 123$^e$ will be correspondingly shifted and the arm 122$^e$ will move therewith, holding the pin 125$^f$ in contact with the shoulder 127$^f$. As this movement continues a projection 130$^f$ on a pawl 124$^f$ will come in contact with the projection 131$^f$ on the plate 132$^f$, and the pawl 124$^f$ will be forced downward until the shoulder 127$^f$ has passed below the pin 125$^f$, thereby permitting the weight 128$^f$ to drop and shift the valve mechanism 113$^f$ and stop the flow of steam to the cylinder. The plate 132$^f$ is pivotally mounted upon a block arranged in a slot 133$^f$, formed in an arm 134$^f$, secured to the frame of the machine, as shown in Fig. 16. This plate 132$^f$ is normally held against a projection 135$^f$ on the arm 134$^f$ by a spring 136$^f$. As the arm 123$^f$ continues its movement, as hereinbefore stated, its projection 130$^f$ will ride along the back of the projection 131$^f$, gradually rising until the shoulder 127$^f$ has reached a position above the pin 125$^f$, as shown in dotted lines in Figs. 15 and 16. As the arm 123$^f$ begins to move back by reason of the upward movement of the blocks 73$^e$ the projection 130$^f$ on the pawl will pass forward or to the right in Fig. 16 over the projection 131$^f$. As the shaft 93$^e$ is rotated to normal position in the manner hereinbefore described the shoulder 127$^f$ will strike the pin 125$^f$, so that the arm 122$^f$ will be drawn to the right with arm 123$^f$ and thereby so shift the valve mechanism 113$^f$ as to permit the flow of steam to the cylinder 4. As the pawl 124$^f$ moves down its projection 130$^f$ will strike the front wall of the projection 131$^f$ and shift it to one side, such movement being permitted by the spring 136$^f$.

As shown in Figs. 2 and 24, the connection between the valve-stem 114$^f$ and arm 115$^f$ is formed by a pin or block on the latter projecting into a slot in the stem 114$^f$. This construction permits of the gradual movement of the arms 122$^f$ and 123$^f$ from the normal position shown in full lines in Fig. 16 to the point where the arm 122$^f$ is released without shifting the valve 113$^f$. In order to prevent a shock to the valve mechanism 113$^f$ when the weight 128$^f$ drops, the latter is arranged around a cylinder fitting loosely over a stationary piston, as shown in Figs. 2 and 4, or the cylinder may be provided with a small escape-opening. It is also preferred to arrange springs within the slot in the valve-stem on opposite sides of the pin on the arm 115$^f$ for the additional security against shocks, as shown in Fig. 24.

In operating my improved press a follower D is dropped into the mold or compressing-box and descends therein until caught by the projecting tongues 75$^e$. The material to be compressed is then fed into the machine in suitable quantities. As the plunger 11$^a$ descends the shear-blades 12$^a$ on the sides thereof, coöperating with the stationary blades 27$^b$, will shear off projecting ends of the material and force that portion of the material lying between the blades 27$^b$ and the side walls connecting the molding or compressing box with the guides 26$^a$ down into the mold or compressing-box. As the plunger 11$^a$ reaches the lower limit of its movement the cams 32ª will, through the coöperation of the arms 29ª, which are connected to the plunger 11ª and the springs 34ª, be forced inwardly over the cross-head 24ª, thereby preventing the upward movement of such cross-head and the retaining-plunger 22ª during the first part of the upward movement of the main plunger 11ª. As soon as the main plunger has been lifted sufficiently far to permit of the inward movements of the catches or catch-bars 38ᶜ without coming into contact with the shearing-blades 12ª said catch-bars 38ᶜ are forced inwardly by the springs 45ᶜ operating through the medium of the bars 43ᶜ and bolts 41ᶜ, such inward movement of these parts being controlled by the cams 48ᶜ, which are connected to the main plunger by the links 52ᶜ, and operating on the levers 46ᶜ to control the catches. As soon as the catches have been shifted inwardly to prevent any upward movement of the material the cams 32ª are moved outwardly from over the cross-head 24ª, thereby permitting said cross-head to be lifted by the spring 25ª, and with it the retaining-plunger 22ª. These several operations of feeding material in over the compressing-box or mold, shearing off the projecting ends of such material, forcing it into the compressing-box or mold, holding it in such compressed condition by the retaining-plunger during the preliminary upward movement of the main plunger, and simultaneously permitting the inward movement of catch-bars and releasing the retaining-plunger are continued until a required quantity of material has been forced into the compressing-box or mold above the follower D, resting, as hereinbefore stated, on the tongues 75ᵉ. During the downward movement of the main plunger 11ª, immediately after material has been fed in under the same, the catch-bars are moved outwardly from over the compressing-box or mold by means of the cams 48ᶜ shifting the upper ends of the levers 46ᶜ outwardly from the paths of movement of the blades 12ª, said levers being connected, as hereinbefore stated, to the bars 43ᶜ, and they in turn to the arms carrying the catch-bars 38ᶜ by the bolts 41ᶜ. During the latter part of the operation of forming a bale or block the tongues 75ᵉ are forced downward, carrying with them the blocks 73ᵉ. The downward movement of these blocks 73ᵉ will move the inner ends of the bars or rods 91ᵉ downwardly and by reason of their angular connection to the blocks 73ᵉ will impart to said bars a longitudinal movement, thereby compressing the springs 99ᵉ. As soon as the bars 91ᵉ have reached a position in which the springs 99ᵉ will present a maximum resistance to the downward movement of the blocks 73, which point of maximum resistance will be approximately half-way between the normal position of said bars or rods 91ᵉ, as shown in Figs. 12 and 13, and the point where they will lie in a plane passing through the axes of their angular movement. During the downward movement of the blocks 73ᵉ to the position of maximum resistance the arm 123ᶠ on one of the shafts 93ᵉ will be shifted to the left, as shown in Fig. 16, thereby bringing a projection 130ᶠ on the pawl 124ᶠ into contact with the projection 131ᶠ on the pivotally-mounted plate 132ᶠ. As the shaft 93ᵉ continues to be rotated by the downward movement of the blocks 73ᵉ the pawl 124ᶠ will be shifted downwardly against the tension of the spring 126ᶠ until the shoulder 127ᶠ on said pawl has been shifted out of line with the pin 125ᶠ on the arm 122ᶠ. As soon as the arm 122ᶠ is released, as stated, the weight 128ᶠ, as shown in Fig. 2, will drop and thereby, through the connected mechanism, as described, shift the valve 113ᶠ and stop the flow of steam to the operating-cylinder 4. This stoppage of the flow of steam to the cylinder 4 occurs, as stated, at the time when the bale or block is submitted to maximum compression, or, in other words, when the springs 99ᵉ, operating through the rods 91ᵉ, present maximum resistance to the downward movement of the blocks 73ᵉ, carrying the tongues 75ᵉ, which support the follower D. The operator now turns the hand-wheel 69ᵇ, so as to rotate the shaft 68ᵇ and through it the disks 67ᵇ, mounted on said shaft. The movement of these disks 67ᵇ, operating through the mechanisms hereinbefore described, will effect the outward movement of the sections 56ᵇ of the compressing-box or mold, thereby permitting access to the sides of the block or bale in the box or mold. The ends of the bale tie or band are then passed over the bale and the ends overlapped and secured together by driving a nail through them into the bale or block or in any other suitable manner, as shown in Fig. 22. During this fastening of the bale-bands the upper end of the bale is prevented from rising by the catch-bars 38ᶜ. As soon as the bale has been secured another follower D is placed on top thereof and steam is admitted into the operating-cylinder 4 by operating the valve 137 in the by-pass around the valve 113ᶠ, formed by the pipes 138, as shown in Figs. 1 and 3. This downward movement of the plunger will force the follower and the underlying bale downward sufficiently far to shift the blocks 73ᵉ such a distance that the consequent rotation of the shafts 93ᵉ will so move the pawl 124ᶠ that its projection 130ᶠ will pass over the projection 131ᶠ and the pawl will be forced to a position where its shoulder 127ᶠ will resume normal position in front of the pin 125ᶠ on the arm 122ᶠ. Further, this downward movement of the bale or block will carry the blocks 73ᵉ down such a distance that the inner ends of the rods or bars 91ᵉ will lie slightly below a horizontal plane passing through the axes of the angular movement of said bars or rods, such plane being indicated by the line $aa$ in Fig. 13. It will be readily understood that as soon as the axes of the pivotal connections of the bars or rods 91ᵉ with the blocks 73ᵉ pass below the plane indicated by the line $a\,a$ the springs $99^e$, operating through the bars or rods $91^e$, will tend to force the blocks $73^e$ down. Such downward movement of the blocks $73^e$ will be prevented by the springs $104^e$, which are placed under a considerable tension by the arms $100^e$ on the shafts $93^e$ coming in contact with the caps $101^e$ at the lower ends of said springs shortly prior to the movement of the inner ends of the rods $91^e$ below the plane indicated by the line $a\ a$. The springs $99^e$ and $104^e$ are so adjusted as regards their tension when the parts are in the position last stated that the springs $104^e$ will be somewhat stronger in their efforts to raise the blocks $73^e$, operating through the arms $100^e$, shafts $93^e$, and bars or rods $91^e$, than the effort of the springs $99^e$ to move the blocks $73^e$ downward. It results from this adjustment of the tension of the springs $99^e$ and $104^e$ that the tongues $75^e$ are relieved to a considerable extent from pressure by the followers. Simultaneous with the downward movement of the blocks $73^e$ to the position above stated, where the springs $99^e$ and $104^e$ approach and pass a balance, the fingers $89^e$ on the lower ends of the blocks $73^e$ strike the lower toes $88^e$ on the dogs $83^e$, thereby shifting the lower end of said dogs outwardly, and through such movement of the dogs $83^e$ the upper ends of the levers $80^e$ are moved outwardly. By this movement of the levers $80^e$ the tongues $75^e$ are, through the medium of the links $78^e$, drawn out of engagement with the follower D. As soon as the tongues $75^e$ are released, as above stated, the springs $104^e$ will, operating through the arms $100^e$, rotate the shafts $93^e$ so as to move the inner ends of the bars or rods $91^e$ above the plane indicated by the line $a\ a$. As soon as the inner ends of the bars or rods $91^e$ pass above the plane indicated by the line $a\ a$ the springs $99^e$ will force the blocks $73^e$ to their upper position. In order to prevent any shock or jar due to the rapid upward movement of the blocks $73^e$, these blocks are connected, as hereinabove stated, to the pistons $108^e$ of the cylinder $109^e$, which is provided with a regulated outlet controlling the flow of fluid-pressure from the cylinder as the piston is raised by the blocks $73^e$. By the upward movements of the blocks $73^e$, and the consequent reverse rotation of the shafts $93^e$ the arm $123^f$ is shifted to the right in Fig. 16, carrying with it the arm $122^f$ and thereby raising the weight $128^f$ and opening the valve $113^f$, so that the press will resume its automatic operation.

As the blocks $73^e$ reach their upper position the toes $87^e$ on the upper ends of the dogs $83^e$ are struck by the fingers $89^e$ on the blocks $73^e$, thereby shifting said dogs, and with them the levers $80^e$ and links $78^e$, inwardly. This movement of the levers and links will not affect the tongues $75^e$, as the inner ends thereof will bear against the sides of the block or bale in the box or mold, and the tongues will remain in this position until the next follower moves down into line therewith, when the tongues will be forced inwardly by springs $90^e$.

Immediately after the placing of the follower D on the completed bale or block suitable bale-bands are passed through the compressing-box or mold and arranged in grooves $d$ in the follower D, and as soon as the bale-bands have been arranged in position the movable wall-sections $56^b$ are returned to normal position, as shown in Fig. 3.

The press having been started into operation on the forcing down of the follower and completed block or bale in the manner above stated, material is fed into the compressing-box or mold and the operation of the formation of a new bale or block continued in the manner hereinbefore described.

The only resistance presented to the downward movement of the completed bale or block and the superincumbent follower is that due to the friction of the sides of the completed bale or block with the inner walls of the compressing-box or mold until such time that the follower on top of the completed block or bale has reached a position in which the sockets in its ends come into line with the tongues $75^e$ of the mechanism which, for convenience, I will designate the "density" mechanism. As soon as the tongues $75^e$ engage the follower, the plane of such engagement being indicated by the line $b\ b$, Fig. 21, the bale or block in process of formation will be subjected to a gradual increase in compression due to the resistance presented by the springs $99^e$ of the density mechanism. As soon as the tongues $75^e$ have reached a position indicated by the line $c\ c$, Fig. 21, where the density mechanism presents the maximum resistance, the operation of the press is automatically stopped, as hereinbefore described, the movable sections of the compressing-box or mold are turned outwardly, the bale-bands are secured around the completed bale or block, a new follower is inserted, additional bale-bands are placed in position on the follower, and the main plunger again forced downward by the opening of the valve in the by-pass. The followers are made of such a thickness that when forced into the compressing-box or mold by the plunger the completed block or bale will be forced downward such a distance—e. g., to the line $d\ d$, Fig. 21—as to effect in the manner hereinbefore described the release of the tongues $75^e$ from the follower under the completed block or mold, and also the automatic shifting of the valve $113^f$ so as to permit the flow of steam to the operating-cylinder.

The operation of forming a bale or block for my improved press may be divided into two stages. The first is that in which the material is fed into the compressing-box or mold and pressed or compacted upon the follower. During this pressing and compacting stage no great pressure is placed upon the material, only such as is necessary to overcome the friction between the sides of the completed block or bale and the walls of the compressing-box or mold. The formation of the bale during the first stage is indicated in Fig. 21 by the sectioned portion between the follower and the line *e*. The second stage is that immediately succeeding the engagement of the tongues 75$^c$ of the density device with the follower. In this stage the bale or block is gradually subjected to a pressure sufficient to obtain the desired density in the block or bale. The amount added to the bale or block during the second stage is indicated by the sectioned portion above the line *e*.

In order to provide for the reversal of the press at any stage in the operation, the main valve of the cylinder 4 is connected by an arm 139 and a link 140 to one end of a lever 141, and the valve 10 in the passage 9 of the regulating-cylinder 8 is also connected by an arm 142 and rod 143 to the lever 144. By operating the lever 144 when steam is cut off from the main cylinder 4 the flow of fluid from one end of the cylinder 8 to the other is stopped, thereby arresting the movement of the piston 5 and the main plunger 11$^a$ at any desired point.

In order to prevent the scoring of the sides of the compressing-box or mold by the balebands, grooves *b* are formed in the side walls of said box or mold, as clearly shown in Figs. 4, 5, and 11.

When it is desired to employ a quick upstroke, the ends of the cylinder 8 are connected by a pipe 145 of larger capacity than the passage 9, so that the fluid may flow rapidly from the upper to the lower end of the cylinder. Within this pipe is located a check-valve 146, which is arranged to prevent a flow of the fluid from the lower to the upper end of the cylinder through said pipe.

I claim herein as my invention—

1. In a press, the combination of a reciprocating plunger, a compressing-box or mold open at both ends, stationary cutting-blades arranged on opposite sides of the box at the charging end thereof, blades attached to the plunger, and a retaining-plunger for holding the material in the box or mold during the return movement of the main plunger, substantially as set forth.

2. In a press, the combination of a main plunger, a retaining-plunger, means for holding the retaining-plunger stationary, a box or mold open at both ends, catches arranged at the upper end of the box or mold and means for shifting the catches, substantially as set forth.

3. In a press, the combination of a main plunger, a retaining-plunger, means operative by the main plunger for holding the retaining-plunger stationary, a box or mold open at both ends, catches arranged at the upper end of the box or mold and means for operating the catches, substantially as set forth.

4. In a press, the combination of a main plunger, a retaining-plunger, means for holding the retaining-plunger stationary, a box or mold, catches arranged at the upper end of the box or mold and means operative by the main plunger for shifting the catches, substantially as set forth.

5. In a press, the combination of a main plunger, a retaining-plunger, a cross-head connected to the retaining-plunger, a spring arranged between the cross-head and the main plunger, cams and connections from the cams to the main plunger whereby the cams are moved inwardly over the cross-head during the downward movement of the main plunger, and are forced outwardly during the upward movement of the latter, substantially as set forth.

6. In a press, the combination of a plunger, a box or mold, catches for retaining the material in the box or mold, springs for shifting the catches inwardly, levers connected to the catches, and cams operated by the plunger for shifting the levers and catches outwardly during the downward movement of the plunger, substantially as set forth.

7. In a press, the combination of a plunger, a box or mold open at both ends, two side walls of the box or mold being provided with movable sections and means for shifting said sections and locking them in closed position, substantially as set forth.

8. In a press, the combination of a plunger, a box or mold open at both ends, and provided on opposite sides with movable sections, arms secured to shafts and having a link connection to the movable sections and means for simultaneously rotating the arms to shift the sections to and from closed position, substantially as set forth.

9. In a press, the combination of a stationary box or mold having open ends, a plunger for forcing the material into the box or mold, and supports for yieldingly preventing the onward movement of the block or bale through the box or mold, whereby the material is subjected to compression during its passage through the box or mold, substantially as set forth.

10. In a press, the combination of a plunger, a box or mold having open ends, yielding supports for resisting the onward movement of the material being pressed through the box or mold, and means for withdrawing said supports on a predetermined movement of such material through the box, substantially as set forth.

11. In a press, the combination of a plunger, automatic means for operating the plunger, a box or mold open at both ends, yielding supports for resisting the onward movement of the material through the box and mechanism operative on a predetermined movement of the material being pressed through the box for stopping the plunger, substantially as set forth.

12. In a press, the combination of a plunger, automatic means for operating the plunger, a box or mold open at both ends, mechanism operative to stop the plunger on a predetermined movement of the material being pressed through the box and to start the plunger on a further movement of such material, substantially as set forth.

13. In a press, the combination of a plunger, a box or mold open at both ends, tongues projecting into the path of movement of the material being pressed, and springs arranged to present a gradually-increasing resistance to the movement of the tongues when shifted by the material, substantially as set forth.

14. In a press, the combination of a plunger, a box or mold open at both ends, tongues projecting into the path of movement of the bale or block, springs arranged to present a gradually-increasing resistance to the movement of the tongues during a portion of their travel and to shift the tongues in the direction of the movement of the bale or block after a further movement of the tongues, and springs arranged to resist the secondary action of the first springs, substantially as set forth.

15. In a press, the combination of a plunger, a box or mold open at both ends, tongues projecting into the path of movement of the bale or block, springs arranged to present a gradually-increasing resistance to the movement of the tongues during a portion of their travel and to shift the tongues in the direction of movement of the bale or block after a further movement of the tongues, springs arranged to resist the secondary action of the first springs, and means for withdrawing the tongues from the path of movement during conjoint operation of both springs, substantially as set forth.

16. In a press, the combination of a plunger, a box or mold open at both ends, a movable block, a tongue mounted on the block and projecting into the mold, a lever having an adjustable connection with the tongue and means operative by the block for shifting the lever, whereby the tongue is withdrawn from the box or mold, substantially as set forth.

17. In a press, the combination of a plunger, a box or mold open at both ends, a movable block, a tongue mounted on the block and projecting into the box or mold, a lever having an adjustable connection with the tongue, a pivotally-mounted dog having a pivotal connection to the lever, and provided with toes and a finger attached to the block and adapted to engage the toes on the dog, substantially as set forth.

18. In a press, the combination of a plunger, a box or mold open at both ends, a movable block, a tongue mounted on the block and projecting into the box or mold, a bar or rod having a pivotal connection to the block, a pivotal support for the bar or rod constructed to permit of a longitudinal, as well as a rocking movement of the bar or rod and a spring arranged to resist the longitudinal movement of the bar or rod, substantially as set forth.

19. In a press, the combination of a plunger, a box or mold open at both ends, a movable block, a tongue mounted on the block and projecting into the box or mold, a bar or rod having a pivotal connection to the block, a pivotal support for the bar or rod normally holding the latter at an angle less than a right angle to the path of movement of the block and constructed to permit of a longitudinal, as well as a rocking, movement of the bar or rod, a spring arranged to resist the longitudinal movement of the bar or rod, and a spring arranged to impart an initial upward movement to the block, substantially as set forth.

20. In a press, the combination of a plunger, a box or mold open at both ends, a movable block, a tongue mounted on the block and projecting into the box or mold, a shaft, a bar or rod passing through the shaft and having a pivotal connection to the block, the shaft being arranged so that in the normal position of the parts the bar will be at an angle less than a right angle to the path of movement of the block, a spring arranged to resist the longitudinal movement of bar or rod through the shaft, an arm secured on the shaft and a spring arranged in the path of movement of said arm, substantially as set forth.

21. In a press, the combination of a plunger, automatic means for operating the plunger, a box or mold open at both ends, a movable block, a tongue mounted on the block and projecting into the box or mold, a shaft connection from the movable block to the shaft whereby the latter is rotated by the block when shifted, an arm secured to the shaft, a pawl pivotally mounted on the shaft, an arm loosely mounted on the shaft, connections from the arm to the mechanism operating the plunger, the loosely-mounted arm being held in engagement with the pawl by such connections and a trip for shifting the pawl out of engagement with the loose arm, substantially as set forth.

In testimony whereof I have hereunto set my hand.

GEORGE L. PEABODY.

Witnesses:
DARWIN S. WOLCOTT,
F. E. GAITHER.